US007658776B1

(12) United States Patent
Pearson

(10) Patent No.: US 7,658,776 B1
(45) Date of Patent: Feb. 9, 2010

(54) BIOMASS REACTOR FOR PRODUCING GAS

(76) Inventor: Larry E. Pearson, 12 Rolling Green Cir., Winona, MS (US) 38967

( * ) Notice: Subject to any disclaimer, the term of this patent is extended or adjusted under 35 U.S.C. 154(b) by 865 days.

(21) Appl. No.: 10/899,748

(22) Filed: Jul. 27, 2004

Related U.S. Application Data

(63) Continuation-in-part of application No. 09/649,463, filed on Aug. 25, 2000.

(60) Provisional application No. 60/150,661, filed on Aug. 25, 1999.

(51) Int. Cl.
*C10J 3/08* (2006.01)
(52) U.S. Cl. ..................................... 48/62 R
(58) Field of Classification Search ............... 48/61–90
See application file for complete search history.

(56) References Cited

U.S. PATENT DOCUMENTS

| 1,901,170 | A |   | 3/1933  | Karrick             |
|-----------|---|---|---------|---------------------|
| 4,057,396 | A | * | 11/1977 | Matovich ..... 422/202 |
| 4,071,151 | A | * | 1/1978  | Farber ......... 414/187 |
| 4,385,905 | A |   | 5/1983  | Tucker              |
| 4,439,209 | A | * | 3/1984  | Wilwerding et al. ..... 48/76 |
| 4,498,909 | A |   | 2/1985  | Milner et al.       |
| 4,655,891 | A |   | 4/1987  | Ward et al.         |
| 4,925,456 | A | * | 5/1990  | Egglestone ..... 48/127.9 |
| 5,226,927 | A |   | 7/1993  | Rundstrom           |
| 5,462,676 | A | * | 10/1995 | Pitts ............ 210/774 |
| 5,486,269 | A |   | 1/1996  | Nisson              |
| 5,507,846 | A |   | 4/1996  | Coffman             |
| 5,551,958 | A |   | 9/1996  | Antal, Jr.          |
| 5,707,408 | A | * | 1/1998  | Kudo ............ 48/117 |
| 5,997,594 | A | * | 12/1999 | Edlund et al. ..... 48/76 |
| 6,413,479 | B1| * | 7/2002  | Kudo et al. ..... 422/198 |

FOREIGN PATENT DOCUMENTS

WO WO 98/00361 * 1/1998

* cited by examiner

*Primary Examiner*—Jennifer K Michener
*Assistant Examiner*—Imran Akram
(74) *Attorney, Agent, or Firm*—H. Roy Berkenstock; Sarah Osborn Hill; Wyatt, Tarrant & Combs, LLP

(57) ABSTRACT

Apparatus for producing synthesis gas from a biomass feed in a closed, helical coil reactor utilizing a heat source such as a natural gas burner. The reactor includes the helical coil disposed in a reactor vessel with the heat source positioned toward a bottom of the reactor vessel. A heat shield is preferably disposed within at least an upper section of the helical coil, and the coil is placed adjacent to, but spaced from, a sidewall of the vessel so that convective heat may flow upwardly and around the individual coils of the helical coil. A lower section of the helical coil is preferably exposed to direct heat from the heat source. This lower section may exhibit a coil diameter that is greater than a coil diameter of the upper section. The biomass feed may be supplied to the helical coil from a mixing chamber including a spiraling screw valve.

20 Claims, 7 Drawing Sheets

US 7,658,776 B1

BIOMASS REACTOR FOR PRODUCING GAS

CROSS-REFERENCE TO RELATED APPLICATIONS

This application is a continuation-in-part of U.S. patent application Ser. No. 09/649,463 filed Aug. 25, 2000, which claims priority from U.S. provisional application Ser. No. 60/150,661 filed Aug. 25, 1999.

STATEMENT REGARDING SPONSORED RESEARCH OR DEVELOPMENT

Not applicable.

REFERENCE TO A "MICROFICHE APPENDIX"

Not applicable

BACKGROUND OF THE INVENTION

1. Field of the Invention

The present invention relates to an improved gasifier/reactor fed by a biomass of cellulosic material such as granulated wood, rice hulls, chopped cane and the like, for the production of a gas selectively rich in hydrogen and carbon containing components such as carbon monoxide, carbon dioxide, and methane, which in turn may be converted into a selected end product fuel such as methanol or ethanol, or used as a feed gas for an industrial power plant.

2. General Background of the Invention

Gasification of wood, wood chips including sawdust, wood charcoal and other particulate cellulosic materials have become of increasing interest and importance because of the volatility of petroleum prices, dwindling of fossil fuels such as domestic petroleum and natural gas resources, and the increased dependence of the United States on international imports of these fuels. Gasification of coal and biomass has been practiced for over 100 years, and there are many varieties and types of gasifiers and methods of gasification.

In the instance of gasification of wood, wood chips and wood charcoal and other similar biomass fuels for the production of gas rich in combustibles, static grates or the equivalent have been utilized for supporting the fuel bed of progressively carbonized material and distributing the air, steam or other transport gas to support the pyrolysis gasification process. Vessels that have traditionally been used successfully for gasifying granular biomass such as wood chips and similar cellulosic material have been cylindrical, or somewhat wider or narrower at the grate level than at the surface of the fuel bed, according to the flow of feed and the forced air (or other gas) draft. Concerns with the settling of the fuel bed so that combustion takes place without the need to poke or otherwise stir the fuel bed have provoked a variety of vessel construction, none of which lend themselves to well to a high volume, precisely controlled, continuous process wherein the biomass fuel is efficiently converted to the target gas for supply to conversion into the ultimate fuel to be marketed or used. Prior art gasifiers have traditionally been large structures of brick and mortar, including complicated feed, blower and control systems. U.S. Pat. Nos. 5,551,958 to Antal; 5,507,846 to Coffman; 5,486,269 to Nilsson; 5,226,927 to Rundstrom; 4,655,891 to Atwood; 4,498,909 to Milner, et al; and 4,385,905 to Tuckerare are illustrative of the various reactors and processes which have been utilized for the conversion of biomaterials to a syngas. U.S. Pat. No. 1,901,170 to Karrick discloses the use of a helical coil in a closed loop for gasification of coal and coke; however the operation of such a unit with biomass material is unclear. Necessary feed and mixing mechanisms and gasifier structure for the range of temperatures, pressures and through rates are not disclosed or suggested.

Gasification of biomass fuels generally falls into one or more of the following categories: pyrolysis, air gasification, oxygen gasification, and anaerobic digestion. Pyrolysis is the breakdown of the biomass by heat at elevated temperatures (e.g., 400° F. to 1200° F.) to yield an intermediate gas which is ultimately transformed into a market fuel (gas or liquid such as methane or ethanol). The intermediate gas produced is dependent upon the feed source and the speed and temperature at which the pyrolysis occurs. Fast pyrolysis of finely divided biomass results in maximum intermediate (synthesis gas) gas yields. Inclusion of such things as oxygen and/or steam during the pyrolysis assists in the production of an intermediate gas containing carbon monoxide, carbon dioxide and hydrogen, useful in later conversion into such as ethanol, methanol, ammonia or methane. Other gas additions such as air or nitrogen may be used for synthesis gas having other make-up required for different end products. Anaerobic digestion may be utilized (usually in a secondary reactor) to facilitate various means for the conversion of the intermediate gas into one or more of these final fuels or products.

The difficulties in gasification include the conversion of all of the elements comprising the biomass fuel into gases containing the highest amounts of energy, for later conversion into the final products and the minimization of ash and char. In certain biomass fuels, gasification at lower temperatures produces oils and char requiring additional processing and likely, additional energy or waste in the process. Exposing the base fuel during the pyrolysis to air, water vapor or other components has a direct impact upon the products of pyrolysis, as does the temperature of the process and the duration thereof. By using any of the processes of the prior art, such as the fluidized bed, which is, at least, initially exposed to air and can be additionally exposed to such as oxygen, or others of the described input gasses, some portion of the fuel for gasification is consumed, as by oxidation (burning) effecting the output of the process by producing ash or other undesirable residue. Likewise, the startling size and complexity of installations for the effective production of synthesis gas are illustrated in the above cited patents.

BRIEF SUMMARY OF THE INVENTION

The present invention provides an improved method and apparatus for producing a synthesis gas from a biomass feed. In one aspect, the present invention incorporates a reactor vessel heated, at least in part, by a heat source such as an electric or natural gas heating unit. The reactor vessel generally includes a helical coil or conduit of many turns utilized for carrying the biomass feed and an appropriate transport gas. In one embodiment, the helical coil may exhibit a substantially uniform diameter throughout a substantial entirety of the coil. In another embodiment, however, the coil may exhibit multiple diameters along its length. For instance, an upper portion of the coil may exhibit a first diameter, a lower portion of the coil may exhibit a second diameter greater than the first diameter.

Some embodiments of the helical coil may have a cooling system associated with at least a portion of a support system interconnecting the helical coil with the reactor vessel. For instance, at least a portion (e.g., the lower portion) of the support system may have a cooling coil or a cooling wrap disposed about it. As another example, at least a portion of the support system may exhibit a tube-in-tube or a rod-in-tube design in which an appropriate support material makes up the inner tube or rod while a cooling material (e.g., water, steam, or other appropriate cooling material) may be disposed in or travel through the outer tube.

The many turns of this helical coil may be found in a number of appropriate locations, but are preferably disposed adjacent a sidewall of the reactor vessel. This preferred arrangement of the coil relative to the reactor vessel may be said to provide an air gap between the coil and the vessel sufficient to permit convective heating. The coil generally receives a feed of the biomass material, preferably in ground or granulated form, which is mixed and transported through the reactor coil utilizing the transport gas. In some embodiments, the transport gas may provide heat and/or chemical support to the pyrolysis process in addition to the externally supplied heat that is utilized to transform the biomass material into a target synthesis gas in the reactor coil. The rate of and control over the pyrolysis process in the reactor coil are preferably effected by the inclusion of separated radiant and convective heat zones in the reactor vessel. These heat zones, at least in one embodiment, may generally be determined by the location of a heat shield disposed in the vessel. This heat shield may exhibit any of a number of appropriate designs. For instance, in one preferred embodiment, the heat shield includes an at least generally cylindrical section. Moreover, this heat shield may be disposed in any appropriate location relative to the coil. It is, however, preferred that the heat shield be located at least generally concentrically of the coil. Further, it is also generally preferred that this heat shield be located in an upper region of the vessel above the heat source. The heat shield preferably includes a truncated conical section disposed toward a bottom of the heat shield (closed at an end nearest the heat source) to better establish transition between the radiant and convective heat zones and to facilitate convective heating in the respective zone.

Preferably, the reactor vessel includes a pressurized mixing vessel in which the biomass feed material is mixed and supplied to the reactor coil. This mixing vessel may include a number of appropriate mechanisms capable of hindering loss of pressure within the mixing chamber while allowing the biomass feed material and/or the transport gas to pass therethrough. For instance, a rotary pocket feeder and/or a screw or auger-type feeder may be utilized to accomplish the desired transport and pressure maintenance functions.

While not always the case, the transport gas is preferably heated prior to introduction into the mixing vessel and/or during its time within the mixing vessel. This heating of the transport gas heats the biomass feed material. Heating of the biomass utilizing the transport gas (e.g., superheated steam) facilitates pyrolysis and enhances the mixing and feed of the biomass through the reactor coil to produce the synthesis gas.

The inclusion of a secondary reactor on an output end of the innovative reactor may provide further flexibility in the manufacture of the synthesis gas or a product gas or fuel.

BRIEF DESCRIPTION OF THE DRAWINGS

FIG. 11 is a cross-section view of the reactor coil of the biomass gasifier of FIG. 2.

DETAILED DESCRIPTION OF THE INVENTION

The output of a biomass gasifier is a combustible gas commonly referred to as synthesis gas, or "syngas" and is composed primarily of carbon monoxide and hydrogen but may also include significant concentrations of methane and carbon dioxide. This syngas is generally utilized for chemical synthesis or to make products such as methanol, ethanol, ammonia, hydrogen, and/or methane. The present invention is particularly effective for producing products such as methanol and ethanol. Likewise, while biomass reactors utilize various organic materials from manure to wood to rice and sugar cane hulls, the present invention is particularly useful with a feed of sawdust, as will be discussed below. It should be appreciated, however, that the present invention is sufficiently versatile to utilize other biomass feeds whether for producing fuels such as methanol or ethanol, or for providing feed gas for an industrial application such as generating steam or electricity. Likewise, it should be appreciated that the effectiveness of the present invention is not predicated upon a large size or particular critical mass in order to provide the effective output of syngas. For instance, systems of the invention may be readily scaled up or down to produce as little as about 400 pounds of gas per day or in excess of several thousands or tens of thousands of pounds per day.

Figure 1:
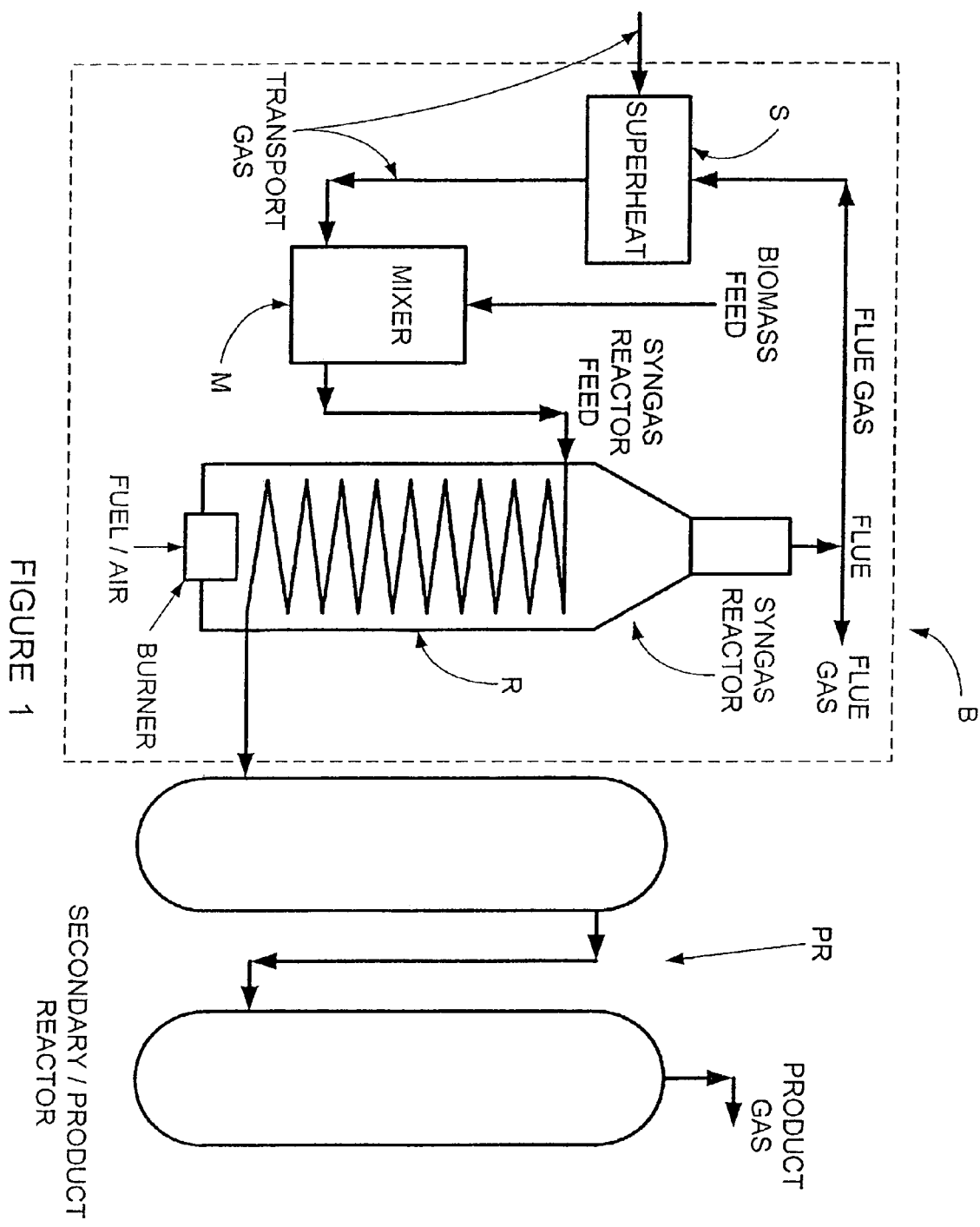
FIG. 1 is a diagrammatic view of a biomass gasifier according to the present invention.

Referring to FIG. 1, biomass gasifier B includes a mixing vessel M and a gasifier/reactor R. FIG. 1 also illustrates a superheater S on an input side of the mixing vessel M. The biomass feed, which in the preferred embodiment is sawdust, as produced at commercial sawmills in the production of lumber for furniture or building materials, is shown as being fed to the mixing vessel M from above. It should be noted that the biomass feed may be fed to the mixing vessel M from a side thereof or even from below is other embodiments. A transport gas utilized to mix and transport the biomass feed, and carry it to the reactor R is input to the mixing vessel M. The transport gas preferably enters the mixing vessel M at a different location of the mixing vessel M than from where the biomass feed enters the mixing vessel M. However, some embodiments may allow for the transport gas and the biomass feed to enter the mixing vessel at substantially the same location. In the present embodiment, the transport gas is steam which is preferably superheated to about 1000° F. by superheater S before being injected into the mixing vessel M. Other gases and temperatures thereof may be utilized as the transport gas, as will be evident to those or ordinary skill in the art.

Output of the mixing vessel M, being a mixture of superheated steam and sawdust (heated to the temperature of the steam) in the illustrated embodiment, is supplied to the reactor R, toward the top thereof. The input of steam and sawdust transits the reactor R and, after pyrolysis and char transformation, is output as a syngas for utilization according to an intended end use or product. As indicated above, the syngas is conventionally utilized for chemical synthesis or a combustible liquid or gas or ammonia. In the present embodiment, the reactor R is adapted to produce a syngas structured for the production of methanol, though with minor modification is readily adapted for the production of ethanol. Production of a variety of such specific products may be more efficiently accomplished by the inclusion of a secondary reactor PR for further processing the syngas to an equilibrium, as is known in the art. The process of producing syngas with other biomass feed sources is similar, varying only in the parameters of the transport gas to get the biomass to a suitable temperature and dryness for pyrolysis, and adjusting the make-up of the components of the syngas produced.

Figure 2:
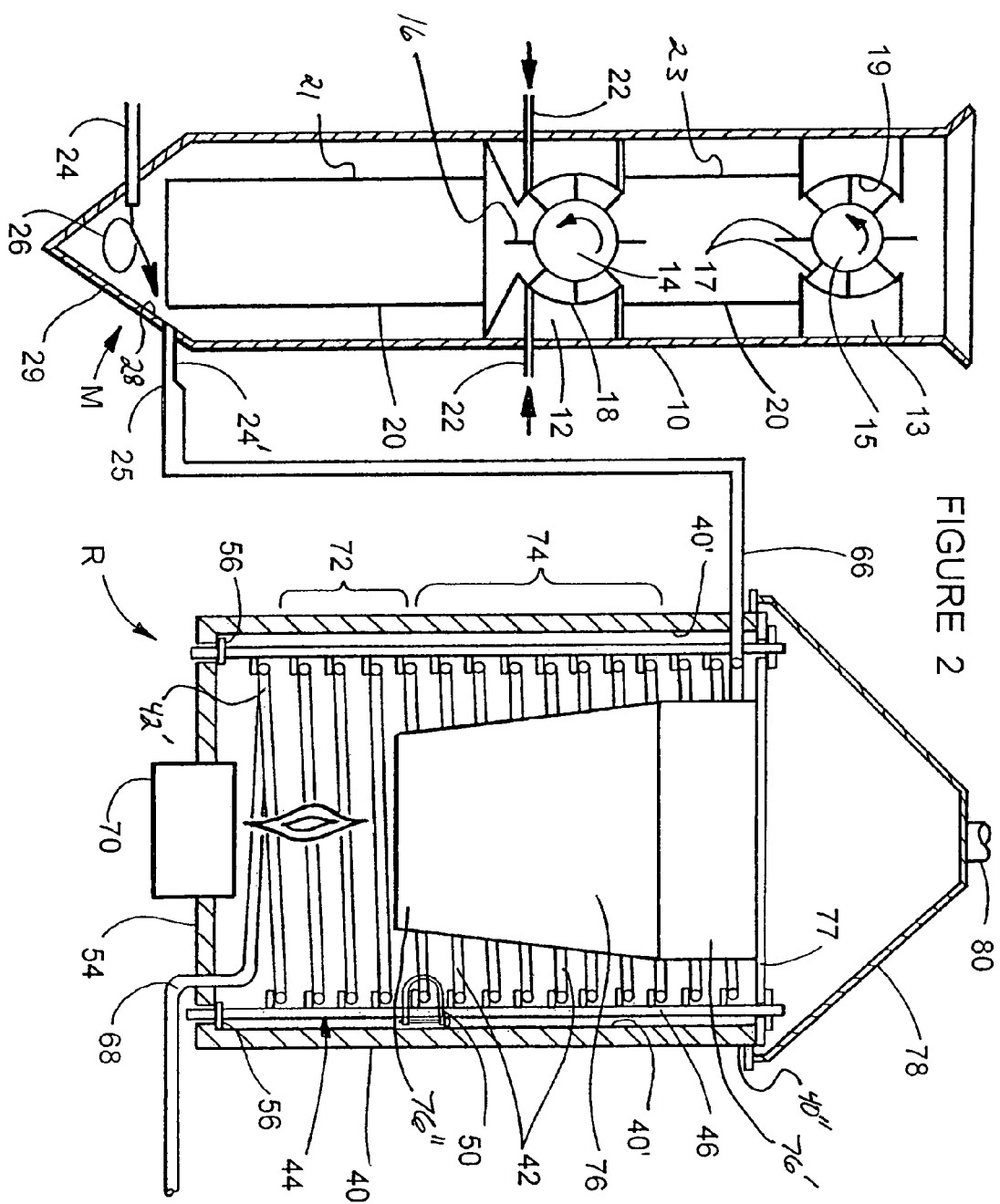
FIG. 2 is a front elevation view (partially in section) of a preferred embodiment of a mixing vessel and biomass gasifier of the present invention.

Referring now to FIG. 2, the details of the mixing vessel M and the reactor R are illustrated. Wood (sawdust) is introduced from a hopper 10 through a vaned rotary valve 12 into the mixing vessel M. This rotary valve 12 generally has a diameter of about 18 inches but may exhibit other appropriate dimensions in other embodiments. An example of an mechanism that is appropriate for use as the rotary valve 12 is a Fuller-Kovako HP 30 rotary feeder. The rotary valve 12 is shown as including a rotatable hub 14 having attached thereto radial vanes 16 which are disposed closely adjacent cylindrical sidewalls 18 of the rotary valve 12. This close relationship of the vanes 16 and the sidewalls 18 serves to at least assist in maintaining the pressure in the mixing vessel M. The hopper 10 contains bulk sawdust and/or other selected biomass feed, which is supplied to the rotary valve 12 by means of a conventional metering rotary valve 13 feeding the amount of biomass feed to the hopper 10, preferably in a manner and/or at a rate sufficient for a particular syngas output. The metering valve 13 has a somewhat similar construction to the rotary valve 12, including a hub 15 and radial vanes 17 which are disposed closely adjacent cylindrical walls 19 of the metering valve 13. In order to ensure that no significant amount of buildup of biomass feed occurs in the hopper 10 at the rotary valve 12, the rotary valve 12 is preferably operated at a higher RPM than the metering valve 13. As noted, one function of the rotary valve 12 is to at least generally seal the interior of the mixing vessel M to the atmosphere. This generally helps maintain gas pressure within the system as well as promotes the pressurized feed of mixed biomass and transport gas traveling from the mixing vessel M to the reactor R.

The biomass feed is introduced into the mixing vessel M by means of the rotating hub 14, which may be rotated utilizing any appropriate means such as an electric motor (not shown). This rotating hub 14 may be said to facilitate the supply of sawdust in being moved into a lower portion 21 of drop tube 20 and toward a bottom of the mixing vessel M. Incidentally, the metering valve 13 and the rotary valve 12 are interconnected by an upper portion 23 of the drop tube 20. This drop tube 20 may be said to contain the biomass feed as it transits to and from the rotary valve 12. What may be characterized as a mating of vanes 16 with sidewalls 18 of the rotary valve 12 is such that a seal against backpressure is at least generally provided thereby between the lower and upper portions 21, 23 (respectively) of the drop tube 20. This seal of sorts may be said to assist in maintaining the pressure of the incoming transport gas to prevent overheating of the rotary valve 12.

Facilitating the seal and the feed of the sawdust, a purge gas is specially supplied to the rotary valve 12 through conduits 22' and 22" located preferably in or just below a lower region of the rotary valve 12 adjacent the lower portion 21 of the drop tube 20. Where the rotary valve 12 operates in the counter-clockwise direction illustrated, the purge gas entering through the conduit 22' may be said to expand the incoming biomass (i.e., sawdust) preventing the transport gas (i.e., steam) from plugging or hampering the discharge of the biomass feed. Further, the supply of the purge gas from the conduit 22" at least generally fills the volume between adjacent vanes 16 hindering, and more preferably, substantially preventing backflow of the transport gas and biomass into an "exit" side of the rotary valve 12. The flow of purge gas in and around the rotary valve 12 also contributes to maintaining the rotary valve 12 at a safe operating temperature, thereby avoiding the need for special high temperature components. The purge gas may be cooled gas(es), dried flue gas(es) from the reactor R, carbon dioxide, and/or nitrogen, as desired. In the illustrated embodiment, the two valves 12, 13 are illustrated for the metering of biomass feed and pressure maintenance in mixing vessel M. However, in other embodiments, a single rotary valve may be utilized. In should be noted that the use of a single rotary valve may coincide with the expense of additional effort to maintain feed rate and pressurization of the system.

Figure 10:
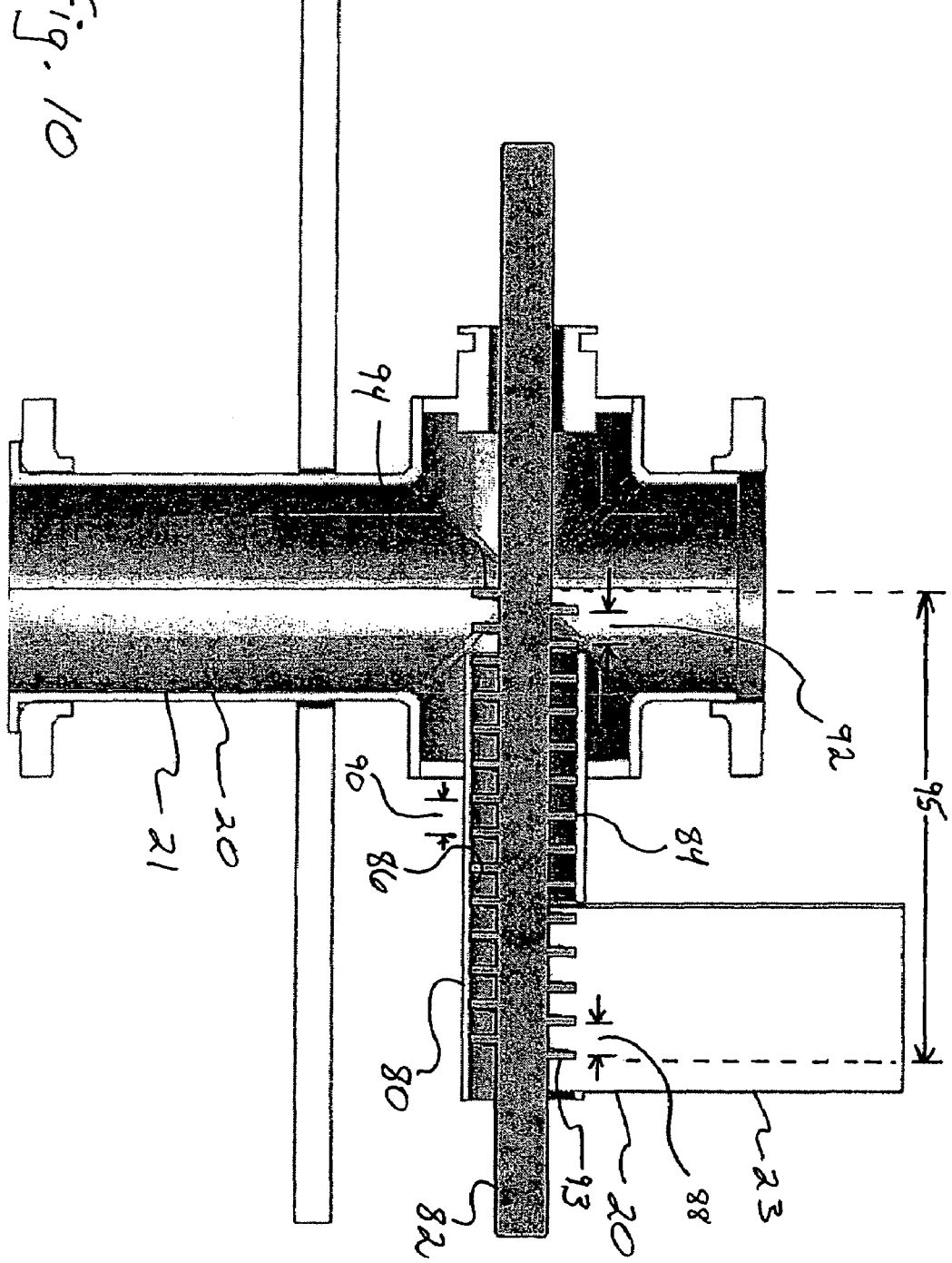
FIG. 10 is cross-section view of another embodiment of a valve and drop tube assembly of the present invention.

FIG. 10 illustrates another valve and drop tube assembly that may be associated with the mixing vessel M of the system. In particular, instead of the upper and lower portions 23, 21 of the drop tube 20 being substantially aligned as in FIG. 2, the embodiment of FIG. 10 shows that the upper portion 23 of the drop tube 20 is substantially offset relative to the lower portion 21 of the drop tube 20. Further, what may be characterized as a screw valve 80 is utilized to interconnect to upper and lower portions 23, 21 of the drop tube 20. The screw valve 80 is shown as including a drive shaft 82 and a spiral feeder 84 disposed about and affixed to the drive shaft 82. In some embodiments, the drive shaft 82 and spiral feeder 84 may be a single, unitary piece. An annular edge of the spiral feeder 84 is preferably disposed closely adjacent cylindrical sidewall 86 of the screw valve 80. It is generally preferred that the clearance between the spiral feeder 84 and the sidewall 86 be as little as possible. For instance, in the illustrated embodiment, the clearance between the spiral feeder 84 and the sidewall 86 is about 0.0025 inch. This close relationship of the spiral feeder 84 and the sidewall 86 serves to at least assist in maintaining the pressure in the mixing vessel M. In other words, the screw valve 80 is employed to at least generally seal the interior of the mixing vessel M to the atmosphere while enabling biomass feed to be introduced into the lower portion of the mixing vessel M. Again, this generally helps maintain gas pressure within the system as well as promotes the pressurized feed of mixed biomass and transport gas traveling from the mixing vessel M to the reactor R.

The distance between adjacent turns of the spiral feeder 84 of the screw valve 80 are shown as being substantially equal. In other words, distance 88 is substantially the same as distance 90, which is substantially the same as distance 92. However, in another embodiment, the distance between adjacent turns of the spiral feeder 84 may tend to get smaller from a first end 93 of the spiral feeder 84 toward a second end 94 of the spiral feeder 84. In other words, in this alternate embodiment, the distance 88 is greater than the distance 90, which is greater than the distance 92. For example, the distance 88 may be about 1.25 inches, the distance 90 may be about 1.0 inch, and the distance 92 may be about 0.75 inch. This reduction in distances between adjacent turns of the spiral feeder 84 may be gradual over a length 95 of the spiral feeder 84 or may be stepped. This causes a volume of a cavity at least generally defined by the screw flights, the drive shaft 82, and the sidewall 86 of the screw valve 80 to decrease along the length 95 of the spiral feeder 84 from the first end thereof to the second end 94 thereof. This decrease in cavity volume may be any appropriate magnitude. For instance, in one preferred embodiment, a cavity volume near the second end 94 of the spiral feeder 84 may be about ⅓ or about 30% less than a cavity volume near the first end 93 of the spiral feeder 84. A benefit of reducing cavity volume or reducing the distance between the adjacent turns of the spiral feeder 84 along its length 95 is that a purge (e.g. gas from 22' of FIG. 2) generally does not have be utilized to promote pressurization of the associated mixing vessel. Another benefit of utilizing such a spiral feeder 84 is that biomass feed material may be fed therethrough at pressures that are higher than what conventional valves can effectively operate under.

Yet another variation of the valve assembly 80 may also provide the same benefits. In this alternate embodiment, the distance between adjacent turns of the spiral feeder 84 of the screw valve 80 are substantially equal. In other words, distance 88 is substantially the same as distance 90, which is substantially the same as distance 92. However, a diameter of the drive shaft 82 may generally enlarge from the first end 93 of the spiral feeder 84 toward a second end 94 of the spiral feeder 84. This change in diameter of the drive shaft 82 may be gradual over a length 95 of the spiral feeder 84 or may be stepped. As with the other alternate embodiment described above, this causes a volume of a cavity defined within the screw flights, the drive shaft 82, and the sidewall 86 of the screw valve 80 to decrease along the length 95 of the spiral feeder 84 from the first end thereof to the second end 94 thereof. It should be noted that other embodiments may exhibit a screw valve in which the distance between adjacent turns of the spiral feeder 84 tends to get smaller from the first end 93 toward the second end 94 of the spiral feeder 84 and in which the drive shaft 82 tends to get bigger from the first end 93 toward a second end 94 of the spiral feeder 84.

In embodiments equipped with the valve and drop tube assembly of FIG. 10, the biomass feed is introduced into the lower portion 21 of the mixing vessel M by rotating the drive shaft 82 and, thus, the spiral feeder 84. This rotation may be accomplished in any appropriate manner such as by use of an electric motor (not shown). The rotating spiral feeder 84 may be said to facilitate the supply of biomass feed in being moved from the upper portion 23 of the drop tube 20 into the lower portion 21 of the drop tube 20 and toward a bottom (e.g., conical mixing chamber 29) of the mixing vessel M.

Referring back to FIG. 2, the transport gas, being superheated steam in the illustrated preferred embodiment, enters the mixing vessel M through entry conduit 24 and mixes with the biomass feed (sawdust) in the lower reaches of the mixing vessel M as illustrated by arrow 26. In order to affect the swirling motion depicted, conduit 24' is positioned tangentially to an inner wall 28 of the mixing vessel M in a conical mixing chamber 30, whereby the pressurized transport gas causes the swirling motion as it follows the outer radius of the inner wall 28. In order to ensure the steam/sawdust mixture remains in the mixing chamber 30 and does not drift upwardly toward rotary valve 12, for clear exit at output conduit 24', the drop tube 20 extends into the mixing chamber 30 to just above the input conduit 24. In the illustrated embodiment utilizing a biomass feed of sawdust, the temperature of the steam transport gas is on the order of about 1000° F. and a pressure of between about 25 psi and about 50 psi in the input conduit 24 approaching the mixing vessel M. As the transport gas enters the mixing vessel M, the conduit 24 vents the transport gas tangentially adjacent the conical mixing chamber 30, disposed below the drop tube 20. The action of the transport gas expanding as it exits the conduit 24 causes additional mixing action with the biomass fuel as they tend to rise up the increasing diameter of the mixing chamber 30, keeping the bottom of the cone clear of sawdust. The transport gas (superheated steam) serves to raise the temperature of the biomass feed above its dew point to enhance the likelihood that there is no condensation occurring in the transport gas/biomass feed, since condensation may cause plugging and/or uneven flow of the mixture and transport gas. Pressure of the transport gas and biomass mixture in the interior of the mixing vessel M is between about 25 psi and about 50 psi according to the desired feed rate of the biomass and throughput time for the chemical transformation to the target synthesis gas to be produced in the gasifier/reactor R. As the swirling mixture passes the exit conduit 24', it exits, heading toward the gasifier/reactor R. En route in conduit 24', the mixture passes through reducer 25, which in the illustrated embodiment is an eccentric transition of conduit 24' from a 2 inch diameter to a 3 inch diameter (being the diameter of helical coil 42 of gasifier R), reducing and slowing the flow of the mixture about to enter gasifier reactor R. An eccentric reducer is preferably utilized to ensure no settling, trapping or collecting of biomass feed at the reducer 25.

FIG. 2 also illustrates the biomass gasifier R which consists of an insulated vessel 40 having disposed therein a helical coil 42 being centrally located in vessel 40, with individual coils 42' disposed generally adjacent, but not in contact with, sidewall 40' of the vessel 40. The coil 42 is supported by a floating frame 44, which, in the illustrated embodiment, consists of at least four generally vertical tubes 46 fabricated of high temperature material, such as 304 or 310 stainless steel or equivalent (310 stainless is preferred when the component is exposed to the radiant heat of the burner 70). The tubes 46 are preferably symmetrically placed around individual coil loops 42' and have individual support stations 48 (FIG. 3) disposed thereon, symmetrically spaced vertically in order to provide a substantially uniform helix through its extent within vessel 40. Individual clamps 50 (310 stainless or equivalent), disposed on the tubes 46 adjacent the support stations 48 encircle individual loops 42' of the coil 42 to facilitate the coil being centrally located on frame 44. The clamps 50 are conveniently U-shaped (i.e., U-bolts) and fabricated of a high temperature tubular material (310 stainless or equivalent) and are loosely secured around individual loops 42' of the coil 42 (as better illustrated in FIG. 3) to enable the coil 42 to expand and contract under a swing of temperature within the vessel 40 as it comes up to operating temperature and again as it cools down when secured. Floating frame 44 is mounted in a base 54 of the vessel 40 in a donut-shaped moveable mount 56 which may be welded or otherwise fixedly secured to tube 46 adjacent the end of the tube 46. The tubes 46 are generally disposed and retained in holes 58 (preferably circular and of a diameter to allow movement of the frame 44, as at the tubes 46 to accommodate for expansion and contraction of the coil 42 during heating and cooling) in the base 54. The holes 58 are surrounded with a bearing plate 60 (preferably circular in shape and complementary to mount 56) such that the weight of the coil 42 and the frame 44 including the tubes 46 are supported on the base 54 at the bearing plate 60. By supporting the coil 42 with the tubes 46 vented outside the vessel 40, cooling gas may allow the utilization of lower temperature materials, particularly in the intensely heated radiant zone of the vessel 40.

Figure 3:
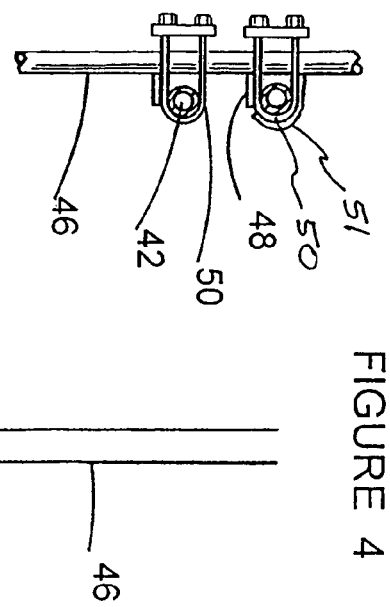
FIG. 3 is a partial view of a mounting apparatus for a reactor coil of the present invention.
Figure 5:
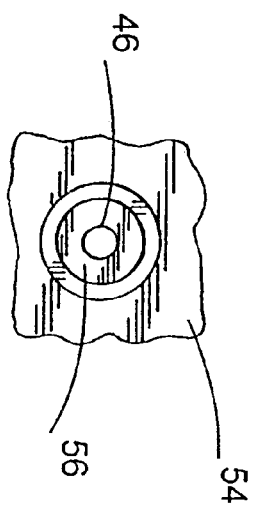
FIG. 5 is a top view of the support frame for the reactor coil of the present invention.
Figure 4:
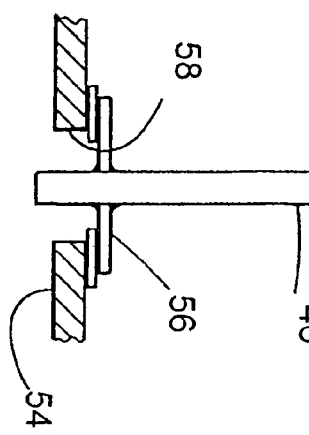
FIG. 4 is a partial view, in section, of a mounting apparatus of a reactor coil support frame of the present invention.
Figure 6:
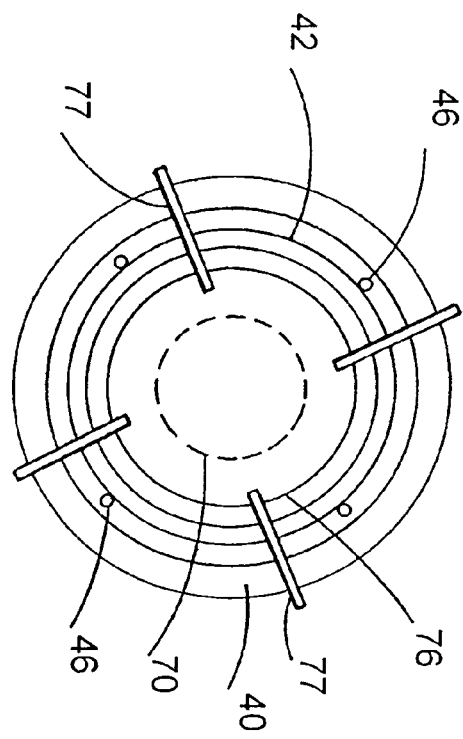
FIG. 6 is a top view of the reactor coil, support frame, and heat shield of the present invention.

Referring to FIG. 3, one of the clamps 50 is shown as having a cooling system 51 associated therewith. This cooling system 51 may refer to a cooling coil or a cooling wrap disposed about one or more of the clamps 50 and/or the support stations 48. In one embodiment, the cooling system 51 and one or more of the clamps 50 are arranged in a tube-in-tube or a rod-in-tube design in which the inner tube/rod is the clamp 50 and the outer tube is an appropriate conduit in and/or through which a cooling material (e.g., water, steam, or other appropriate cooling material) may be disposed to cool the clamp 50 and/or support station 48.

Biomass gasifier/reactor R receives the transport gas supporting the biomass at intake 66 disposed at the top of insulated vessel 40 to coil 42. The combination of transport gas and biomass travel helically down the coil 42 until the product of the gasification exits the biomass gasifier/reactor R at exit port 68 adjacent the base 54 of the vessel 40. While in the coil 42, the high velocities and centrifugal action of the traveling mixture cause it to be further mixed and homogenized. Heat source 70, powered preferably by an external fuel, such as natural gas, provides direct, radiant heat to the coil 42 and the mixture therein in the radiant heat zone, as indicated at 72, to carry out the gasification process, as later described. Above the radiant heat zone 72 is a convective heat zone 74 wherein predominant heating of the coil 42 and the contents therein is by heat rising out of the radiant heat zone and adjacent the vessel wall 40' and heat shield 76. The heat shield 76 is disposed concentrically in the coil 42 above the zone of effective radiant heating 72 and is fabricated of a high temperature material (310 stainless or equivalent). Preferably, the heat shield 76 is in the shape of a truncated cone 76" disposed at the lower end of a cylinder 76', closed at a minor base, the varying diameter of which progressively increases from the radiant heat zone 72 toward the cylindrical portion 76' which extends to slightly above the top of the vessel 40 and the coil 42. The shape of heat shield 76 is coordinated to maximize the transfer of convective heat to the coil 42 over the convective heat zone 74 as hot flue gases rise through the vessel 40 from the heat source 70 to the hood 78 and flue pipe 80. The truncated cone 76" provides a efficient use of a combination of the radiant and convective heat in the transition from their respective zones 72 and 74. The heat shield 76 is suspended concentrically in the coil 42 as by being attached to and hung from several symmetrically placed studs 77 disposed on the top of vessel 40. The hood 78 is conveniently supported on the vessel 40 by means such as a support ring 79, fixed to the upper, outer wall 40" of the vessel 40. The flue pipe 80 may function to vent away combustion exhaust from the heat source 70, and may include a supply of flue gas for purge gas or as otherwise described.

Figure 7:
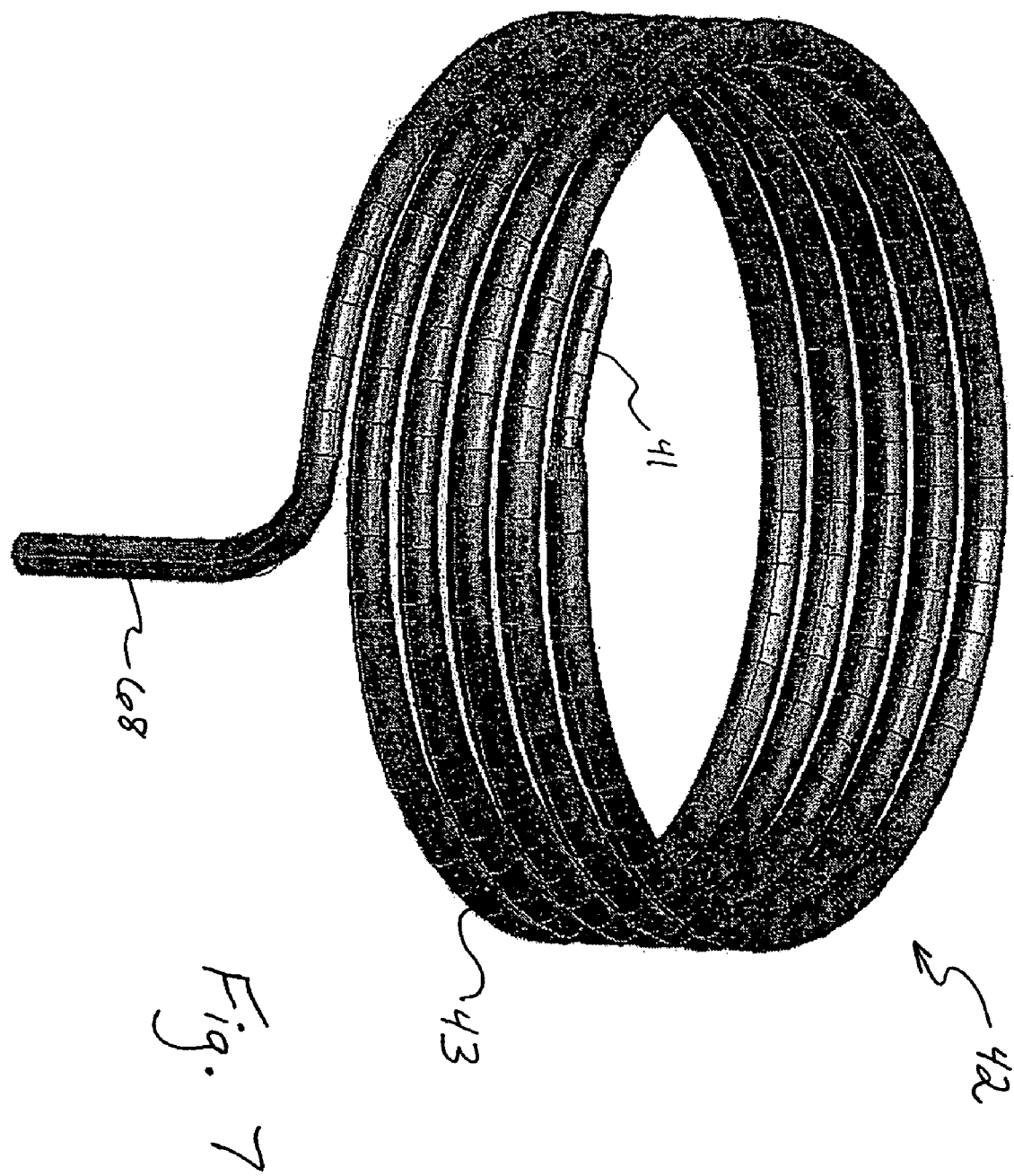
FIG. 7 is a perspective view of another embodiment of a reactor coil of the present invention.
Figure 8:
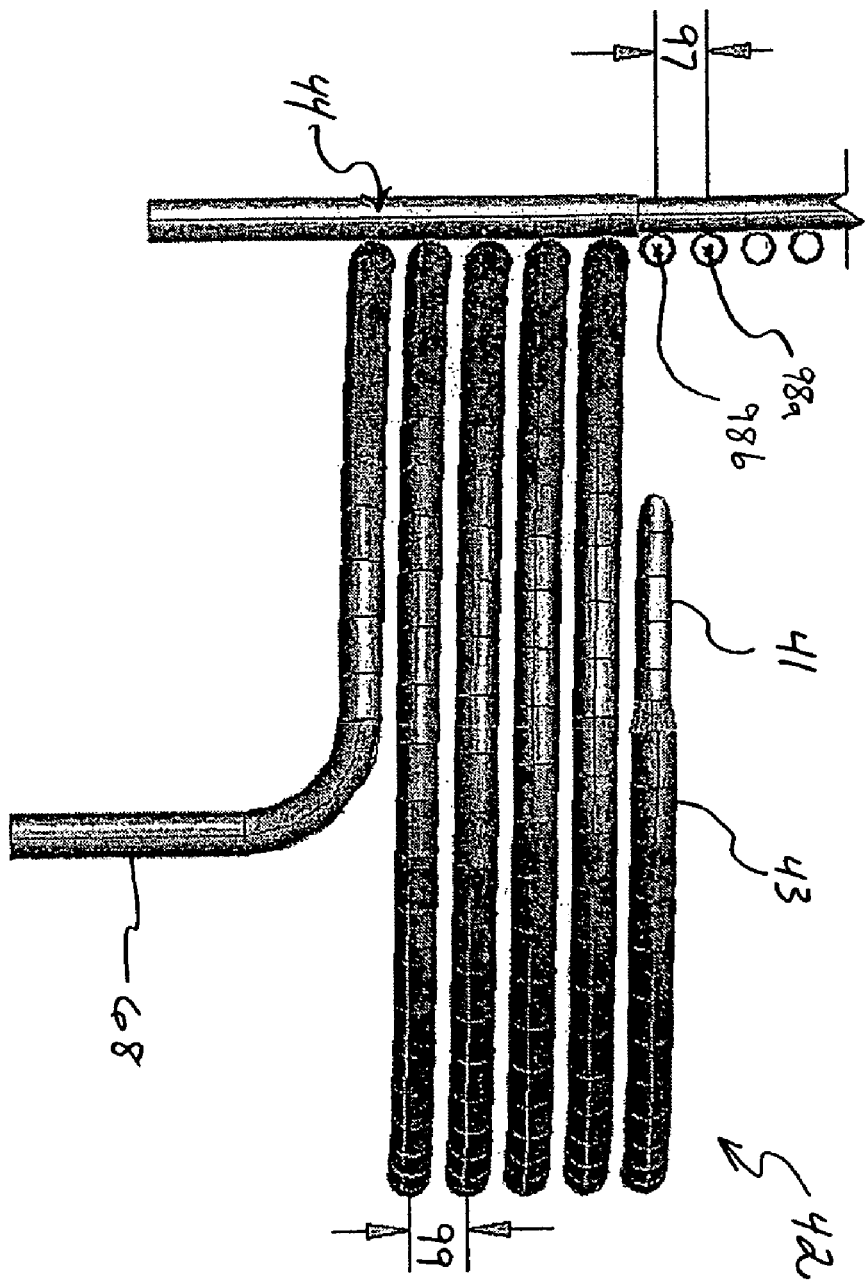
FIG. 8 is a side view of the reactor coil of FIG. 7.
Figure 9:
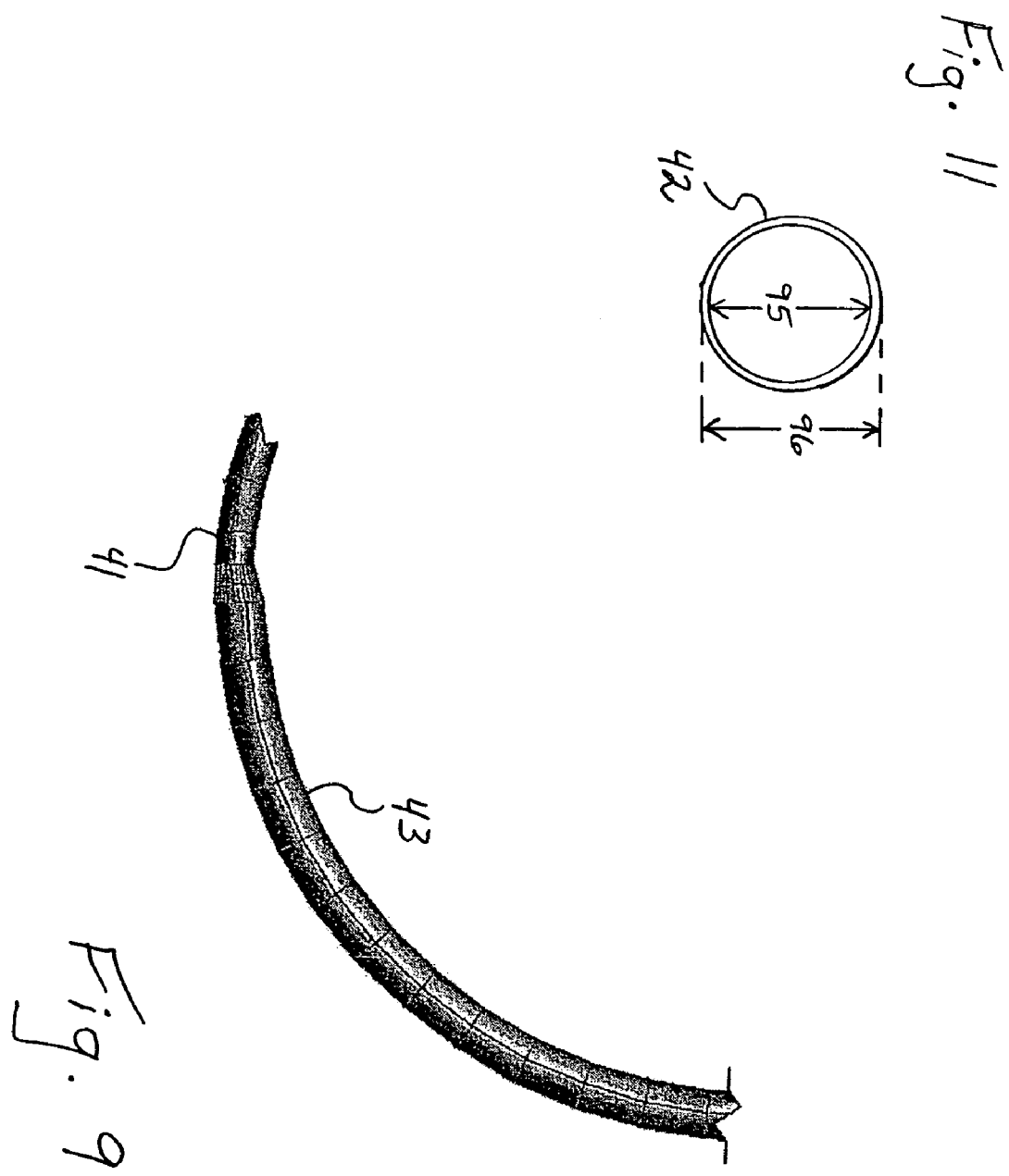
FIG. 9 is a top view of a portion of the reactor coil of FIGS. 7-8.

The helical coil 42 of the gasifier/reactor of FIG. 2 is shown as having a substantially uniform inside diameter 95 and outside diameter 96 (FIG. 11). However, an alternative embodiment of the reactor coil 42 is shown in FIGS. 7-9 in which the reactor coil 42 exhibits a plurality of inner and outer diameters. More particularly, an upper portion 41 of the reactor coil 42 exhibits a first inner diameter and a lower portion 43 of the reactor coil exhibits a second inner diameter greater than the first inner diameter. These first and second inner diameters may be any appropriate diameters. For instance, in the preferred embodiment shown in FIGS. 7-9, the inner diameter of the conduit of the upper portion 41 of the reactor coil 42 is about 3 inches, and the inner diameter of the conduit of the lower portion 43 of the reactor coil 42 is about 4 inches. This change in diameter may be gradual over a portion of the length of the reactor coil 42 or may be stepped (e.g., a substantially immediate change in inner diameter). Referring to FIG. 8, the reactor coil 42 generally includes approximately 49-50 individual turns or coils. Incidentally, other embodiments may include other appropriate numbers of turns/coils. The first about 43-45 coils generally exhibit a substantially similar first inner diameter. The last about 5-6 coils generally exhibit a substantially similar second inner diameter that is greater than the first inner diameter. In the case where the first inner diameter is about 3 inches, a distance 97 from a radial origin 98a of one coil to a radial origin 98b of another adjacent coil of the upper portion 41 is about 5 inches. By contrast, in the case where the first inner diameter is about 3 inches, a distance 99 from a radial origin of one coil to a radial origin of another adjacent coil of the lower portion 43 is about 6 inches. It should be noted that other embodiments may exhibit other appropriate distances (e.g., 97, 99) between adjacent coils).

Still referring to FIGS. 7-9, having the lower portion 43 of the reactor coil 42 exhibit an inner diameter that is greater than the inner diameter of the upper portion 41 tends to help in accommodating the increased volume (e.g., due to increased temperature, pressure, and velocity) of the syngas as it travels from the upper portion 41 to and through the lower portion 43 of the reactor coil 42. This accommodation of the increased syngas volume may be said to provide a benefit of at least generally extending the use life of the reactor coil 42.

While the upper portion 41 of the reactor coil 42 of FIGS. 7-9 may be made of the same material as the lower portion 43 of the reactor coil 42, this change in inner diameters between the two portions may be accompanied by a difference in materials utilized to make of the reactor coil in those two portions. For instance, the upper portion 41 may be made of 304 and/or 310 stainless steel, and the lower portion 43 may be made of a high-temperature alloy such as a iron-nickel-chromium alloy (e.g., Incoloy® 800H). Other materials at least generally capable of withstanding the temperatures and pressures described herein may also be appropriate for one or both the upper and lower portions 41, 43 of the reactor coil 42.

The specific reactions which occur in the inventive biomass gasifier R are similar to the reactions performed in other types of gasifiers (such as fluidized bed) being a combination of drying, pyrolysis, reforming gasification and thermal degradation. The resulting gas composition is determined by the temperature, pressure, residence time, biomass/steam (or other transport gas) ratio, biomass/transport gas ratio. the type of gas used for transport, and the biomass ultimate composition. Since most biomass materials require oxygen in addition to that contained in the biomass material used, the additive oxygen is preferably selected based upon other elements necessarily added to obtain the desired composition of the syngas produced. In the present invention it should be recognized that (because of the effectively closed system) the only elements available for the manufacture of syngas are those included in the make-up of the biomass feed and the transport gas. The illustrated embodiment of a biomass gasifier is effective to directly produce syngas suitable for the production of ethanol or methanol. However, the illustrated embodiment may be effectively utilized in combination with a secondary reactor to reach an equilibrium product gas. Accordingly, steam or carbon dioxide are the preferable transport gases, thereby maximizing the carbon and hydrogen components as well as supplying additional oxygen. Hydrogen may also be a suitable transport gas, but it has traditionally been harder to handle and less cost efficient. Where the syngas is to be used as the input for the production of ammonia, nitrogen or air may be preferable transport gasses. Those skilled in the art may recognize the suitable additives, depending upon the ultimate use of the syngas produced in the gasifier/reactor R. What should be recognized of the inventive gasifier/reactor R illustrated is that the system is effectively closed to any input other than the biomass feed and the transport gas thereby enabling an accurate control over the formulation of the syngas product in the reactor. It should also be recognized that a relatively high pressure of input transport gas and feed of a particulate such as sawdust produces a very rapid mixing and heating of the transport gas/biomass in the heating zones of gasifier R with the result that a high volume output is achieved, far exceeding the output of conventional plants of comparable physical size, and far exceeding the volume of output per cost of such conventional plants.

By way of example, for a gasification reactor of the described embodiment, adapted for the production of methanol, steam is used as the transport gas and is input at the conduit 24 which is about 1 inch in diameter, to the mixing vessel M at a pressure of about 50 psi and a temperature of about 900° F. to 1000° F. The depth of the drop tube 20 is about 3 feet and is 2 to 3 feet in diameter. The depth of the conical mixing chamber 29 is about 8 inches. The pressurized rotary valve 12 and metering rotary valve 13 (or screw valve 80) are each about 18 inches in diameter. The ratio of transport, in pounds, is about 1.0 of steam to about 1.0 of sawdust, adjusted higher to balance output to component ratios. The grind size of the biomass feed is approximately 100% ⅛ inch or less, and preferably, the moisture content is between 10% and 15%. The residence time of the biomass/steam mixture in the gasifier R is preferably as long as possible, in the range of about 0.5 to 2 seconds (particularly if a secondary reactor PR is used). However, this residence time may be extended to five to ten times these values, depending upon the reactions (i.e., approach to equilibrium of the syngas components) to be accomplished in reactor coil 42 and also depending upon the biomass (sawdust) feed rate and the particular chemistry of the syngas desired to be produced. Those skilled in the art should recognize the shortness of the general dwell times of the reacting mixture as unrivaled by conventional systems. The exit gas temperature is approximately 1750° F. The target composition of the syngas produced in this example is: hydrogen, about 50%; carbon monoxide, about 25%; carbon dioxide, about 20%; and methane, about 5%. During this process of gasification, approximately the top 10% of the coil 42 acts as a drier operating at about 1500° F. to about 1750° F. to dry water out of the biomass to prepare it for the next steps of the process such as: devolatilization; pyrolysis; gasification (of char); water gas shift; methane reforming; and such other related reactions as are necessary for the end product from a secondary reactor. As the biomass dries, the temperature of the mixture in the coil 42 rises (from about 1750° F. to about 1950° F.), transits the middle range, boils off heavy liquids (tars, etc.) in the biomass, and prepares the mixture for pyrolysis which occurs in the approximate final or lower third of the coil 42 at temperatures upwards to about 2200° F. In the illustrated embodiment, the radiant zone 72 extended over about a lower half of the coil 42 and the convective zone 74 extended over about an upper half of the coil 42. During that transit, thermal breakdown of the molecules of the biomass progresses to such intermediates as carbon monoxide, hydrogen, carbon dioxide and methane. The pyrolysis process is expedited to produce gas and char as contrasted to the production of liquids which occurs in slow pyrolysis. Any char produced is preferably gasified by converting it to carbon monoxide (as by the addition of water and also yielding hydrogen) or by the addition of carbon dioxide and yielding carbon monoxide. The rate of biomass throughput, pressures and temperatures may be sufficiently varied and controlled to vary the output of the illustrated gasifier R to as much as about 9000 gallons of methanol from about 60 tons of sawdust, daily. The illustrated embodiment has a coil tube 42' diameter of about 3 inches, and the length of the coil is about 1000 feet, wound into a helical coil of about 8 feet in diameter and standing about 20 to 25 feet high. The vessel 40 is about 10 feet in diameter, and the heat shield 76 has a nominal diameter of about 6 feet. Typical operation produces an exit velocity of the gas typically from about 500 feet per second to more than about 1000 feet per second.

Depending upon further processing of the syngas produced to this point, the process may additionally include the accomplishment of a water gas shift wherein water and carbon monoxide are converted to carbon dioxide and hydrogen. Likewise, methane re-forming may be accomplished wherein methane, by the addition of water, may be converted to carbon monoxide and hydrogen.

As stated above, natural gas is utilized to fuel the heat source 70 to provide sufficient heat to the coil 42 for the several reactions describe. It is alternatively possible to supplement the natural gas feed with the inert purge stream from the methanol loop. Some of the raw product gas from the biomass gasifier may be used to supplement the natural gas, depending upon the costs of natural gas and the relative efficiency of the gasifier (as affected by the quality of the biomass feed).

In the instance of the utilization of the illustrated biomass gasifier to provide the heat for an industrial power plant for steam and/or electrical energy production, the goal is generally to produce a syngas with as high a heat value as is possible. This type of syngas is characterized by maximizing carbon monoxide, methane and aliphatics. Consistent with this goal, it is imperative that the high heat value is produced with minimal aromatics and/or heavy organics, which are prone to condense to liquid in the system and foul or contaminate it. Close coupling of the biomass gasifier to power generating equipment (i.e., boiler or turbine) helps in that the syngas is burned before the aromatics or organics condense.

In the instance of producing a syngas for power production, the target syngas is preferably: hydrogen, about 5-10%; carbon monoxide, about 60%; carbon dioxide, about 10-15%; and methane, about 15-20%. The system operating parameters in particular example are: transport steam, about 900°-1000° F. (though it may be preferable to utilize carbon dioxide alone or in addition to steam—the selection is dependent upon the quality of the biomass feed and the need to reduce char); the biomass utilized is more optional in that various woods, rice hulls and bagasse are among possible fuels. The ambient temperature, grain size, moisture are similar to that for methanol, and basically determined by the feedability of the biomass. The feed rates call for less steam, about 0.5 to 1 of biomass, in pounds though for carbon dioxide the feed rate may be up to 1.25 to 1. The exit gas temperature from the biomass gasifier will be about 1500° F., and the output may be directly usable as the feed fuel for the boiler, effectively eliminating a need for a secondary reactor for further refinement of the syngas. Contact time in the biomass gasifier is characteristically lower if a secondary reactor is utilized since some of the gas transformation may be preferably accomplished in the secondary reactor. In the instances of some syngas production, as for a fuel feed to a power plant, the syngas may not require the secondary refinement, in which case the contact time in the gasifier will be expected to be somewhat longer. Times for production of particular product gases from secondary reactors are related to the process employed to convert a syngas to the final product, and the dwell dime in the vessel may well be several times the time that for the syngas production in the illustrated invention.

It should be further recognized by those skilled in the art that gasifier reactors according to the presently described invention may be utilized in varying sizes to meet local needs relating to availability of biomass feed and output gas, particularly where the inventive gasifier might feed industrial plant needs for steam or electricity.

The disclosed embodiments are to be considered in all respects as illustrative and not restrictive. The scope of the invention is to be defined by the appended claims rather than the foregoing descriptions. Other embodiments which come into the meaning and range of equivalency of the claims are therefore intended to be included within the scope thereof.

What is claimed is:

1. An apparatus for producing synthesis gas from cellulosic biomass materials by pyrolysis, comprising:
   a reactor vessel having a top, an opposing base, a cylindrical side wall therebetween, and a hood affixed to said cylindrical side wall adjacent to said top of said reactor vessel, an opening in said hood for venting flue gases; said vessel for containing the heat required to chemically transform a biomass feed to synthesis gas;
   said reactor vessel having a convective heat zone in an upper portion of said vessel and a radiant heat zone disposed in a lower portion of said vessel;
   a heat source disposed in said radiant heat zone adjacent to said base for creating said convective and radiant heat zones;
   a helical reactor coil disposed vertically in said reactor vessel traversing said convective heat zone and said radiant heat zone, said reactor coil in spaced relation to said side wall having an input end for receiving biomass feed and an opposing output end for discharging synthesis gas, wherein said input end of said reactor coil is disposed in said convective heat zone, and said output end of said reactor coil is disposed in said radiant heat zone; and
   a support means disposed substantially inside said reactor vessel, said support means comprising a floating frame and a plurality of clamps securing said coil to said frame such that the coil is slidably engaged with the frame whereby the expansion and contraction of the coil upon heating and cooling is accommodated.

2. An apparatus, as claimed in claim 1 wherein:
   said reactor coil comprises a first portion having a first internal diameter disposed generally in said convective heat zone and a second portion having a second internal diameter disposed generally in said radiant heat zone, wherein said second internal diameter is greater than said first internal diameter.

3. An apparatus, as claimed in claim 2, wherein:
   said second portion of said reactor coil is disposed between said first portion of said reactor coil and said base of said reactor vessel.

4. The apparatus, as claimed in claim 2, wherein:
   said reactor coil comprises a plurality of individual interconnected loops forming a helix;
   and the number of individual loops of said first portion of said reactor coil is greater than the number of individual loops of said second portion of said reactor coil.

5. An apparatus, as claimed in claim 1, further comprising:
   a heat shield disposed generally axially within an upper portion of said reactor coil above said radiant heat zone, said heat shield for reflecting heat from said heat source back into said convective heat zone thereby providing additional heat to said reactor coil.

6. An apparatus, as claimed in claim 5, wherein:
   said heat shield has a substantially cylindrical upper portion and a bottom portion exhibiting a truncated cone shape with a closed base, said bottom portion having a varying diameter which progressively increases as the distance to the radiant heat zone increases thereby maximizing the transfer of convective heat to said reactor coil as the flue gases rise through the reactor vessel.

7. An apparatus, as claimed in claim 1, further comprising:
   a pressurized mixing vessel external to said reactor vessel for fluidizing said cellulosic biomass materials with a transport gas having a feed inlet, a transport gas inlet, and a biomass feed/transport gas mixture outlet, said outlet fluidly interconnected with said input end of said reactor coil.

8. An apparatus, as claimed in claim 7, wherein:
   said mixing vessel has a conical bottom portion to enhance the mixing of the cellulosic biomass materials and the transport gas; and
   said transport gas inlet is tangentially affixed to a side wall of said conical bottom portion whereby said transport gas causes a swirling motion about said side wall as it enters said mixing vessel effectively fluidizing said biomass feed in said transport gas.

9. An apparatus, as claimed in claim 7, further comprising:
   a valve connected to said biomass feed inlet of said pressurized vessel for maintaining pressure in said mixing vessel during addition of said biomass feed; and
   a metering mechanism connected to said valve for controlling the rate of addition of said biomass feed.

10. A apparatus, as claimed in claim 9, wherein:
    said valve is a rotary valve.

11. An apparatus, as claimed in claim 9, wherein:
    said valve is a screw feeder.

12. An apparatus, as claimed in claim 9, wherein:
    said metering mechanism is selected from the group of a rotary valve and a screw feeder.

13. An apparatus, as claimed in claim 1, wherein:
    said reactor coil comprises a first coil portion made up of a first material and a second coil portion made up of a second material different from said first material, said second portion of said reactor coil is disposed between said first portion of said reactor coil and said base of said reactor vessel, said second material is capable of withstanding higher temperatures than said first material.

14. The apparatus, as claimed in claim 1, wherein:
    said floating frame comprises at least three tubes extending vertically between said vessel top and said vessel base, each tube having a top end and a bottom end, each of said top ends intersecting said hood such that said top end is external to said reactor vessel, each of said bottom ends intersecting said base such that said bottom end is external to said reactor vessel; said base of said reactor vessel having at least three holes for receiving said bottom ends of said tubes, said holes spaced evenly apart and adjacent to said side wall, said holes sufficiently larger than said tubes to allow for the expansion and contraction of said tubes; and
    at least three mounts for restricting the vertical movement of said tubes affixed to said bottom ends of said tubes and disposed above said holes when said tubes are engaged in said holes, said mounts having an outer diameter which is greater than an outer diameter of said holes.

15. The apparatus, as claimed in claim 14, wherein:
    said coil is comprised of a plurality of interconnected loops forming a helix; and
    said plurality of clamps comprises a plurality of u-bolts, each u-bolt loosely encircling one of said loops of said coil thereby allowing for expansion and contraction of said coil upon heating and cooling but limiting the area for movement of said tube.

16. The apparatus, as claimed in claim 14, wherein:
    said coil is comprised of a plurality of interconnected loops forming a helix; and said support means further comprises a plurality of individual support stations affixed to said tubes and aligned perpendicularly thereto;
said individual loops positioned above said support stations such that said loops rest on said stations.

17. The apparatus, as claimed in claim 14, wherein:
said reactor coil comprises a first portion having a first internal diameter and a second portion having a second internal diameter, wherein said second internal diameter is greater than said first internal diameter.

18. The apparatus, as claimed in claim 17, wherein:
said reactor coil comprises a plurality of individual interconnected loops forming a helix;
and the number of individual loops of said first portion of said reactor coil is greater than the number of individual loops of said second portion of said reactor coil.

19. An apparatus, as claimed in claim 14, further comprising:
wherein said support means further comprises a means for cooling said support means.

20. The apparatus, as claimed in claim 14, wherein:
said tubes are hollow and a cooling fluid enters a first end of said tubes and exits a second end of said tubes thereby cooling said support means.

* * * * *